United States Patent [19]

Williams et al.

[11] 3,964,260

[45] June 22, 1976

[54] ENERGY CONSERVATION APPARATUS FOR AN ELECTRIC VEHICLE

[75] Inventors: Thomas O. Williams, Dunlap, Ill.; Arthur F. Grant, Pittsburgh, Pa.

[73] Assignee: Towmotor Corporation, Mentor, Ohio

[22] Filed: May 27, 1975

[21] Appl. No.: 581,405

[52] U.S. Cl. .................................. 60/413; 60/418; 60/484; 60/DIG. 2
[51] Int. Cl.² ............................................ F15B 1/02
[58] Field of Search ............. 60/404, 405, 408, 409, 60/410, 412, 413, 418, 484, DIG. 2, 698; 180/44 E, 44 F, 44 M; 290/10

[56] References Cited
UNITED STATES PATENTS

| | | | |
|---|---|---|---|
| 2,330,739 | 9/1943 | Piron | 60/418 X |
| 2,595,248 | 5/1952 | Greer et al. | 60/404 |
| 3,014,344 | 12/1961 | Arnot | 60/DIG. 2 |
| 3,083,533 | 4/1963 | Schenkelberger | 60/405 X |

Primary Examiner—Edgar W. Geoghegan
Attorney, Agent, or Firm—Oscar G. Pence

[57] ABSTRACT

A hydraulic accumulator is provided in the hydraulic system of an electric vehicle, such as a lift truck, for conserving its battery power by minimizing the frequency of energy draining pump start-ups during operation. Pressurized fluid stored in such accumulator is utilized for powering any of the various hydraulically actuated work elements employed on the vehicle when the pump is not being run. The system further provides for automatically starting and stopping the pump to keep the pressure in the accumulator within a predetermined operating range and for starting the pump when required to achieve the desired actuation of a particular work element.

8 Claims, 1 Drawing Figure

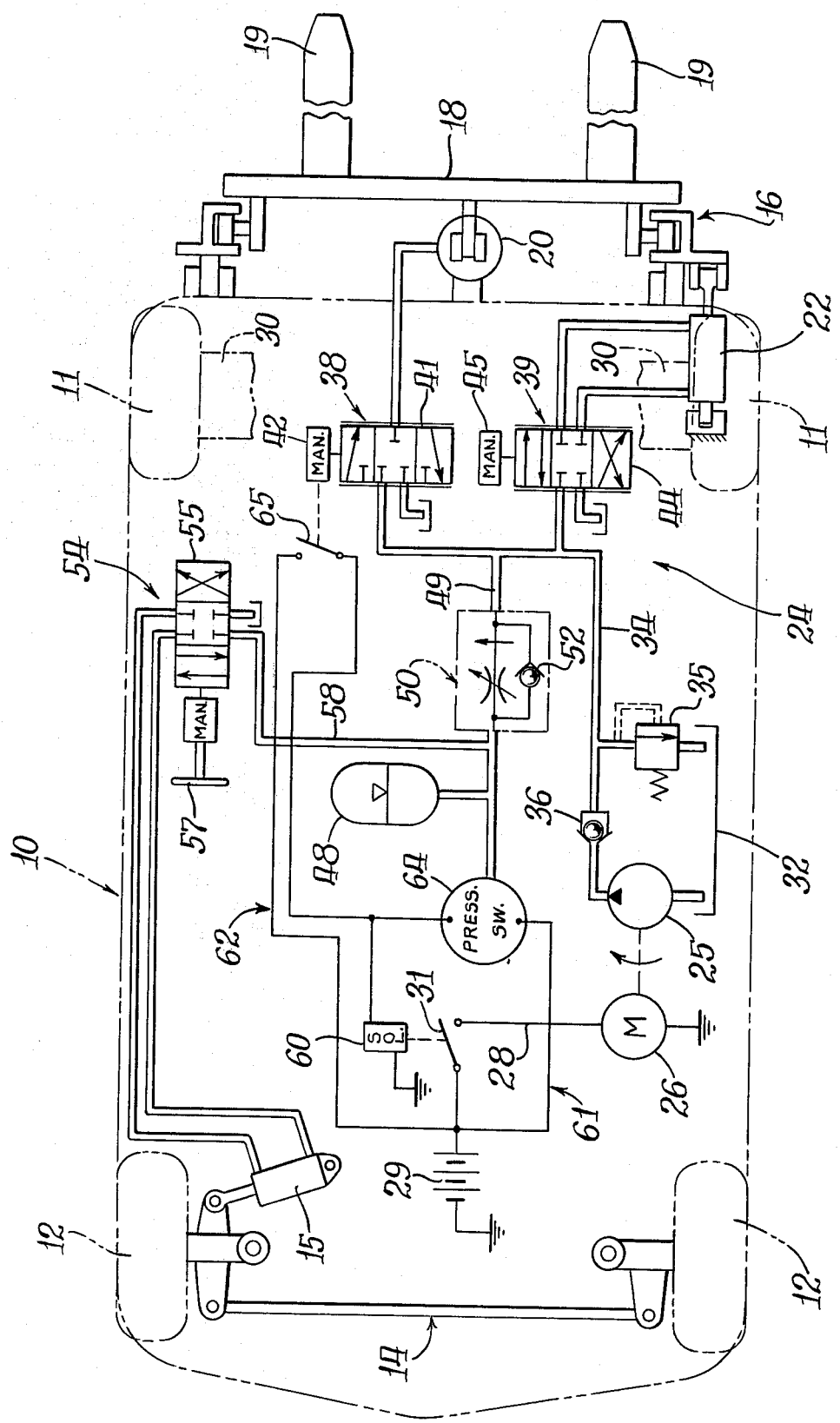

ENERGY CONSERVATION APPARATUS FOR AN ELECTRIC VEHICLE

BACKGROUND OF THE INVENTION

1. Field of Invention

This invention relates generally to an electric vehicle of the type having a hydraulic system for powering various hydraulic work elements employed thereon, and more particularly to means for minimizing the power drain placed on the vehicle's battery by such hydraulic system.

2. Description of the Prior Art

In order to achieve the maximum useful work time per battery charge and to minimize the operating cost of an electric vehicle, such as a lift truck, it is necessary to conserve as much energy as possible during operation. Aside from the propulsion requirements of such lift truck, the single largest energy drain on the battery is from the hydraulic system which is utilized for raising and tilting of the lift mast of the truck and for steering.

In the past, lift trucks have commonly used two or more hydraulic pumps for supplying the fluid pressure of the hydraulic systems. In some instances, such pumps are provided in separate and independent hydraulic circuits, one supplying fluid pressure to the lift cylinder, and another supplying pressure to the tilt cylinder or cylinders. If equipped with power steering, a third pump is used to independently supply fluid pressure to the steering system. In other instances, pumps of different sizes, for example, one large pump and one small pump have been utilized to supply fluid pressure to a common circuit.

One of the greatest deficiencies of such prior systems is the improper matching of the particular flow requirements of the hydraulic system with the output of their pumps. This is because the pumps are sized to meet the maximum flow requirements of the system and their outputs are dependent on the particular speed versus load characteristics of their electric drive motors and not the flow requirements of the system. As a result, the pump or pumps are normally generating more fluid flow than actually being required by the hydraulic system during the majority of operating situations. The excess fluid flow caused thereby is normally dumped back to tank without being used which wastes an inordinate amount of the limited energy available from the battery. This deficiency is somewhat reduced by the use of different size pumps mentioned above.

Another deficiency which robs an excessive amount of energy is the constant starting and stopping of the pumps which, due to the high inertial forces involved, places high peak energy loads on the battery. In the prior systems this occurs each time the mast is lifted or tilted or a steering correction is made. Steering is the greatest offender of this because of the large number of minor steering corrections made during operation.

The use of plural pumps and their associated electric drive motors and related components also greatly increases the cost and complexity of such prior hydraulic systems.

OBJECTS OF THE INVENTION

Accordingly, it is an object of this invention to overcome the above problems by increasing the operating efficiency of the hydraulic system of an electric lift truck so as to conserve the energy of its battery and extend its useful worktime between each battery charge.

Another object of this invention is to provide a hydraulic system which utilizes a single hydraulic pump to supply power for all of the load handling and steering functions of the truck so as to simplify and to lower the overall cost of such hydraulic system.

Another object of this invention is to more effectively utilize the power output of the pump by either satisfying any immediate work requirement desired or by storing any or all of its energy in an accumulator for future use so that the number of pump start-ups occurring during operation is greatly reduced to minimize the frequency of peak energy drains on the battery caused by such start-ups.

Other objects and advantages of the present invention will become more readily apparent upon reference to the accompanying drawing and following description.

BRIEF DESCRIPTION OF THE DRAWING

The drawing is a schematically illustrated view of an electric lift truck and its hydraulic system embodying the principles of the present invention.

DESCRIPTION OF THE PREFERRED EMBODIMENT

Referring more particularly to the drawing, an electric lift truck is generally illustrated schematically in broken lines by reference numeral 10. The truck is supported for movement along the ground by a pair of front drive wheels 11 and a pair of steerable rear wheels 12. A steering mechanism is illustrated at 14 for steering the rear wheels in a conventional manner. Such mechanism is actuated by a double acting steering jack 15.

The lift truck 10 is provided with a lift mast 16 carried at its forward end. The lift mast includes a vertically movable carriage 18 having a pair of forwardly extending load handling forks 19. The carriage is raised and lowered upon the mast by a single acting lift jack 20. The mast, in turn, is tilted forwardly and rearwardly of the truck for alignment purposes with a load, not shown, by a double acting tilt jack 22. The particular embodiment of the lift mast and its related components shown and described herein are to be taken as illustrative and that many variations, such as two tilt jacks and multiple telescopic mast elements commonly employed in prior art lift masts, may be utilized without departing from the spirit of this invention if desired.

Fluid pressure to the steering, lift and tilt jacks is provided by a hydraulic system 24 to which the present invention principally relates. The hydraulic system includes a single hydraulic pump 25 which is operatively driven by an electric motor 26. The motor receives electrical energy through a lead 28 from a storage battery 29. The battery provides all the power for the entire truck, such as for electric propulsion motors 30. The motors 30 are connected to the battery through a conventional control system, not shown. A normally open motor switch 31 is provided in the lead 28 for breaking the circuit to the motor.

The hydraulic pump 25 draws fluid from a reservoir 32 to direct fluid pressure through a first conduit 34. A pressure relief valve 35 is interconnected between the conduit 34 and the reservoir 32 for relieving any undue pressure in the hydraulic system in a normal manner. A load check valve 36 is provided in the conduit between the pump and the relief valve for preventing fluid flow in the reverse direction when pressure is greater on the downstream side thereof.

The hydraulic system 24 includes a pair of implement circuits 38 and 39 for the lift jack 20 and the tilt jack 22, respectively, which circuits are individually connected to the first conduit 34. The lift jack circuit 38 includes an infinitely positionable control valve 41 which has a closed center position, a first operative position for raising the jack and a second operative position for lowering the jack. The lift control valve 41 is actuated by a manual control device 42. FIG. 6, The tilt circuit 39 includes a control valve 44, which has a closed center position and a first operative position for retracting the tilt jack 22 to tilt the mast rearward and a second operative position for extending the jack to tilt the mast forward. The tilt control valve is actuated through a manual control device 45.

The hydraulic system 24 further includes energy storage means, such as a gas charged accumulator 48. The accumulator is connected to the first conduit 34 through a second conduit 49. A pressure compensated flow control valve 50 is provided in the second conduit 49 for restricting fluid flow therethrough. The flow control valve is provided with a bypass check valve 52 through which unrestricted fluid flow to the accumulator is permitted.

The steering jack 15 is disposed within a steering circuit 54 which includes a closed center steering control valve 55. Such control valve is manually actuated by a steering wheel 57 in a conventional manner. The steering circuit 54 is connected to the second conduit 49 of the hydraulic system on the downstream side of the flow control valve 50 through a third conduit 58.

Means are provided for automatically starting and stopping the pump motor 26 in order to keep the fluid pressure in the accumulator 48 within a predetermined operating range, and to insure that adequate fluid flow is available to the lift circuit when fast lifting of the mast carriage is desired. Such means includes a solenoid 60 which is operatively connected to the motor switch 31. The solenoid is connected to two parallel electrical circuits 61 and 62, either of which circuits is effective in energizing the solenoid to close the switch 31.

The first electrical circuit 61 includes an accumulator charging switch 64. The charging switch is a dual pressure sensing type and is connected to the second conduit 49 adjacent the accumulator so as to be responsive to pressure changes in the accumulator. The charging switch is adapted to close the electrical circuit to the solenoid whenever fluid pressure falls below a predetermined low pressure setting, for instance 1400 psig (98.4 kg/sq.cm); and to reopen the circuit when the pressure reaches a predetermined high pressure setting, for instance 2000 psig (140.6 kg/sq.cm). As a result, the pressure in the accumulator is maintained within a given pressure range of from 1400 to 2000 psig (98.4 to 140.6 kg/sq.cm).

The second electrical circuit 62 includes a normally open electrical swtich 65 which is operatively connected to the manual control device 42 of the lift control valve 41. The switch is adapted to be closed by the manual control device whenever such device is moved past a predetermined slow setting intermediate the lift control valve's closed center position and its full raised position.

OPERATION

While the operation of the present invention is believed clearly apparent from the foregoing description, further amplification will be made in the following brief summary of such operation. The hydraulic pump 25 is only run in the present arrangement either when it is needed to recharge the accumulator 48 or when it is needed to supply sufficient fluid to the lift jacks 20 to enable it to raise the mast carriage 18 at a fast rate. The stored energy in the accumulator is advantageously utilized for powering the remaining hydraulic functions of the lift truck during operation without the use of the pump, such as steering, tilting of the mast, and raising of the mast carriage at a slow rate. This significantly reduces the number of pump start-ups occurring during operation which, in turn, decreases the energy drain on the battery by minimizing the frequency of high peak energy demands thereon caused by such start-ups. Consequently, greater operational efficiency is attained.

The construction of the present invention also prevents the inadvertent depletion of the pressurized fluid stored in the accumulator when the lift control valve is moved past its intermediate slow raise position into a faster mode of operation. It will be appreciated that such depletion is possible when pressure in the accumulator is greater than that being supplied by the pump, as when raising the mast carriage quickly in a lightly loaded or no load condition. Such depletion is advantageously prevented by the utilization of the flow control valve 50 which restricts flow from the accumulator to the lift and tilt circuits 38 and 39, respectively. Such restriction does not adversely affect the slow mode of operation of the lift circuit or the operation of the tilt circuit as the restricted flow rate is preselected to accommodate the relatively small flow requirements thereof.

While the steering circuit 54 also normally requires only a relatively small fluid flow, it is connected to the accumulator without any restriction for safety reasons so that sufficient fluid flow will be available to the circuit in the event that rapid emergency steering corrections are needed.

Another advantage of the present invention is its utilization of a single pump which has sufficient capacity to meet the maximum flow and pressure requirements of the hydraulic system without the normally accompanying inefficient dumping of excess fluid to tank during the majority of operating conditions when entire capacity of the pump is not required. This is accomplished by allowing any excess fluid below relief valve pressure to be diverted to the accumulator wherein it is stored for later use.

Thus, it is apparent from the foregoing that the objects of the present invention have been fully satisfied by the particular construction of the present hydraulic system which utilizes stored energy in an accumulator to minimize the starting and stopping of the electric motor driven hydraulic pump to minimize the peak energy demands on the battery of an electric lift truck. Also, the hydraulic system only utilizes a single hydraulic pump which eliminates the multiple pumps of prior systems and the inherent complexity and cost associated therewith.

While the present invention has been described and shown with particular reference to the preferred embodiment, it will be apparent that variations might be possible that would fall within the scope of the present invention which is not intended to be limited except as defined in the following claims.

The embodiments of the invention in which an exclusive property or privilege is claimed are defined as follows:

1. A hydraulic system for an electric vehicle having a battery and an electric motor, comprising:
   a single hydraulic pump driven by said motor;
   means for storing fluid energy produced by said pump for subsequent use in powering said hydraulic system without running said pump so as to reduce the energy drain on the battery by minimizing the frequency of pump start-ups during operation, and including a hydraulic accumulator which is disposed within said hydraulic system for receiving fluid pressure from said pump and for delivering such pressure to the system as required;
   a motor switch electrically disposed in series between said battery and said motor;
   means responsive to the fluid pressure in the accumulator for closing said motor switch when the fluid pressure therein falls below a predetermined low level so as to energize said motor for recharging the accumulator to a predetermined high level of fluid pressure and for reopening the motor switch when said predetermined high level of fluid pressure is attained so that said accumulator is maintained within a predetermined operating range of fluid pressures, and including an accumulator charging switch disposed within said hydraulic system in operative communication with said accumulator and a solenoid operatively connected to said motor switch and electrically disposed in series with said accumulator charging switch and said battery, said accumulator charging switch being adapted to close at said low level of pressure and reopen at said high level so that said motor switch is effectively opened and closed by said solenoid for selectively starting and stopping said motor in order to maintain the fluid pressure in the accumulator within said predetermined operating range; and
   a hydraulic circuit for a work element disposed within said hydraulic system and having a manually actuatable control valve, said control valve being infinitely positionable between a closed center position and a fully actuated position for selectively controlling fluid pressure from the hydraulic system to its work element; and
   means for automatically energizing said motor when the control valve is moved past a predetermined intermediate position toward its fully actuated position so as to provide fluid pressure from said pump to the hydraulic circuit under such conditions.

2. The hydraulic system of claim 1 wherein said means for automatically energizing said motor includes an electrical circuit having a normally open switch and electrically connecting said battery with said solenoid in parallel with said accumulator charging switch, said normally open switch being operatively connected to said control valve so as to be closed thereby when said valve is moved past its intermediate position.

3. In an electric lift truck, the combination comprising:
   a battery;
   an electric motor;
   means electrically connecting said battery to said motor including a normally open motor switch;
   a hydraulic system including a hydraulic pump operatively driven by said motor, first conduit means connected to said pump, and hydraulic circuit means, said hydraulic circuit means including a lift jack and a lift control valve interconnected between said first conduit means and said jack, said control valve being infinitely positionable between a closed center position and a fully actuated position for selectively controlling fluid to the jack for raising a load;
   means for automatically closing said motor switch upon movement of said lift control valve past a predetermined intermediate position toward its fully actuated position;
   a hydraulic accumulator;
   second conduit means for interconnecting the accumulator with the first conduit means;
   a flow control valve disposed within the second conduit means for permitting unrestricted fluid flow therethrough to the accumulator, but restricting flow therefrom to said circuit means; and
   means responsive to fluid pressure in said accumulator for closing said motor switch when pressure therein is below a predetermined low level for recharging the accumulator to a predetermined high level substantially above said low level to provide a selected operating range of fluid pressures therebetween and for reopening said switch when said high level is attained.

4. The combination of claim 3 including:
   hydraulically actuated steering means for effecting the steering of the lift truck; and
   third conduit means interconnecting said steering means to said second conduit means at a position between the accumulator and said flow control valve so as to permit unrestricted flow from said accumulator to said steering means.

5. The combination of claim 4 wherein said hydraulic system includes another hydraulic circuit means including tilt jack means and a tilt control valve, said valve being connected to said first conduit means and connected to said accumulator through said second conduit means so that said circuit means is supplied with fluid pressure therefrom.

6. The combination of claim 5 wherein said fluid pressure responsive means for closing said motor switch includes:
   an electrical circuit connected to said battery;
   a dual pressure responsive accumulator charging switch disposed within said electrical circuit and connected to said second conduit means adjacent said accumulator; and
   a solenoid disposed in series with said accumulator charging switch and operatively connected to said motor switch, said accumulator charging switch being adapted to be closed for completing the circuit to the solenoid when fluid pressure falls below said predetermined low level and reopens when such pressure reaches said predetermined high level.

7. The combination of claim 6 wherein said means for automatically closing said motor swtich upon movement of said lift control valve includes a normally open electrical switch operatively connected to said lift control valve, said switch being disposed in an electrical circuit connected in series with said solenoid and effective in completing said circuit when the control valve is moved past a predetermined intermediate position between said closed center position and said fully actuated position.

8. A hydraulic system for an electric vehicle including an electric motor and a battery for driving such motor, comprising:
a single hydraulic pump operatively driven by said motor;
a first hydraulic circuit for a work implement disposed within said hydraulic system and having a manually actuatable control valve, said control valve being infinitely positionable between a closed center position and a fully actuated position for selectively controlling fluid pressure from the hydraulic system to its work implement;
means for automatically energizing said motor when the control valve is moved past a predetermined intermediate position toward its fully actuated position so as to provide fluid pressure from said pump to the hydraulic circuit under such conditions;
a second hydraulic circuit disposed within said hydraulic system in parallel with said first circuit; and
means including a hydraulic accumulator disposed within said hydraulic system for storing fluid energy produced by said pump in excess of that needed for said first hydraulic circuit for subsequent use in powering the second hydraulic circuit without the necessity of running said pump so as to reduce the energy drain on the battery by minimizing the frequency of pump start-ups during operation.

* * * * *